United States Patent [19]

Heiberger

[11] Patent Number: 4,783,164

[45] Date of Patent: Nov. 8, 1988

[54] ADJUSTABLE RETAINING STRAP FOR EYEGLASSES

[76] Inventor: Robert A. Heiberger, 1629 Canyon, Boulder, Colo. 80302

[21] Appl. No.: 112,822

[22] Filed: Oct. 23, 1987

[51] Int. Cl.[4] .............................................. G02C 3/02
[52] U.S. Cl. ..................................... 351/156; 351/157
[58] Field of Search .................... 351/123, 156, 157; 2/442

[56] References Cited

U.S. PATENT DOCUMENTS 3,397,026  8/1968  Spina .................................. 351/156

Primary Examiner—Rodney B. Bovernick
Attorney, Agent, or Firm—Timothy J. Martin; J. Preston Oxenham

[57] ABSTRACT

An adjustable retaining strap for eyeglasses includes an elongated tubular member formed of a flexible resilient material. End portions of the tubular member are reverse-fold to define end loops that are retained by end sleeves each having a passageway therethrough. An end plug member is matably received in the end portion of the tubular member and is sized to prevent withdrawal of each tube member from its respective retaining sleeve. A central portion of the tubular member between the end loops may be configured in a central loop received by a central sleeve. A central bead may be received on the bight of the central loop to prevent its withdrawal from the central sleeve.

20 Claims, 2 Drawing Sheets

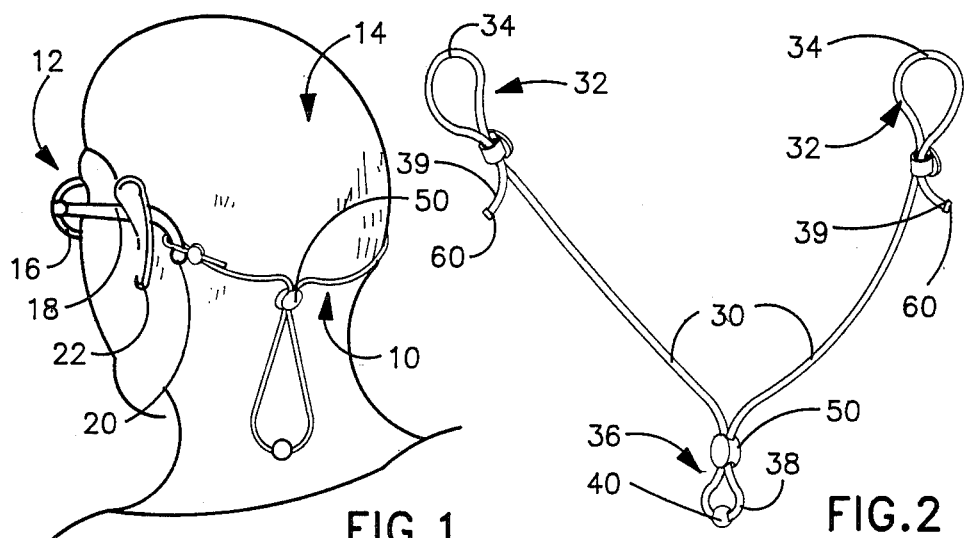
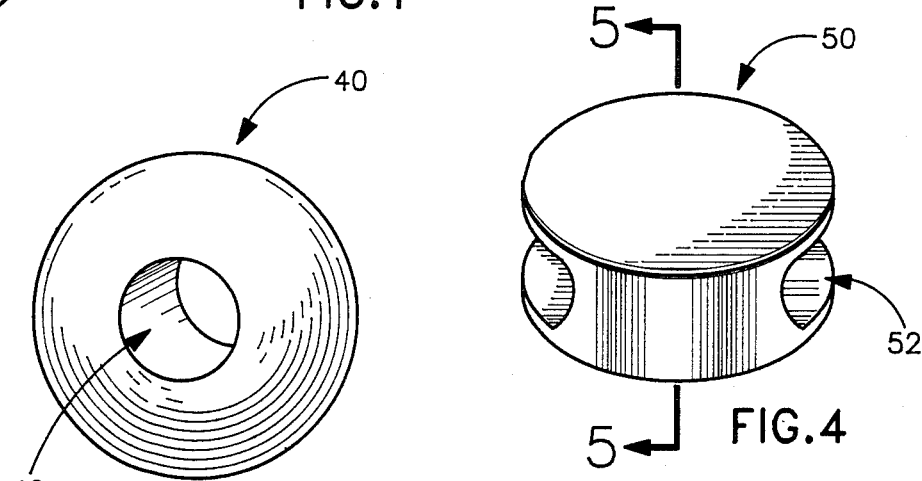
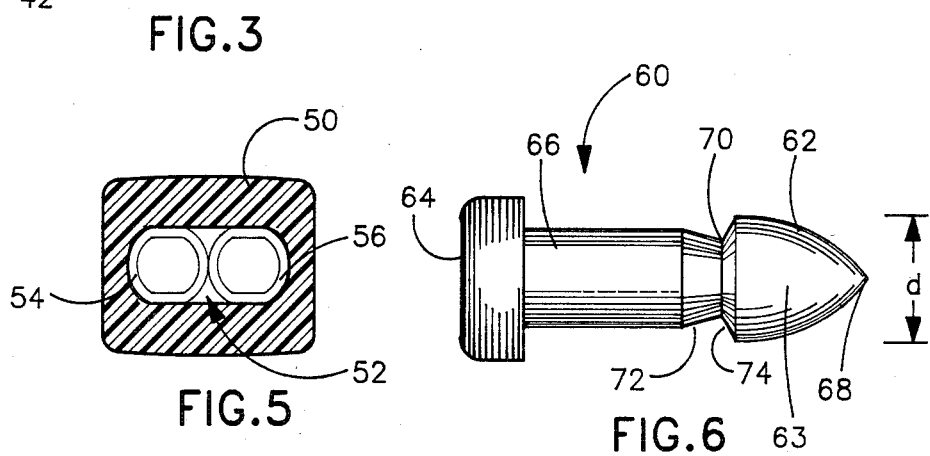

ADJUSTABLE RETAINING STRAP FOR EYEGLASSES

BACKGROUND OF THE INVENTION

The present invention relates to an auxiliary retaining strap used in conjunction with a pair of eyeglasses to help retain the eyeglasses on the head of the wearer. Thus, when used with a pair of eyeglasses, the present invention helps prevent displacement of the eyeglasses during physical activities. To this end, the present invention is specifically directed to an adjustable retaining strap which may be adjustably tightened on the temple pieces of a pair of eyeglasses and which has an adjustable effective length. This adjustable retaining strap may therefore be fairly universally employed with differently configured eyeglass frames as well as differently sized human heads. Furthermore, the adjustable effective length allows a person to remove the eyeglasses and hang the eyeglasses from his or her neck when not being worn.

The use of eyeglasses for various purposes is prevalent in today's society. These purposes include the provision of corrective lenses to improve the eyesight of the wearer, the use of tinted or polarizing lenses to protect the wearer's eyes from the glare of the sun, and the use of transparent plastic goggles to protect the wearer's eyes from flying debris or during physical activity. Typically, such a pair of eyeglasses includes a lens-holding frame extending across the bridge of the nose and a pair of temple pieces that are hingedly fixed to the corners of the lens-holding frame and that extend rearwardly from the frame corners alongside opposite sides of the wearer's head. The temple pieces terminate at the free ends normally adjacent. The lens-holding frames then retain transparent lenses which are either corrective, tinted, polarizing, protective or a combination thereof.

During use of such eyeglasses, it is often desirable to interconnect the free ends of the temple pieces by means of a strap which extends around the back of the wearer's head so that the wearer's head is completely circled by the combination of the eyeglasses and the strap. During active physical motion, it is desirable that such a retaining strap snugly fit the wearer's head to prevent accidental dislodgment or slippage of the eyeglasses. This is especially true during sports activities such as skiing and basketball as well as in the workplace where the use of protective eyeglasses is becoming more pervasive.

A disadvantage arises, though, where the wearer is not required to constantly wear the eyeglasses. Typically, the eyeglasses must be carried in a case to avoid scratching the lenses where the eyeglasses are carried in a pocket or purse. Furthermore, the use of such cases is not only inconvenient, but also it is easy to misplace the eyeglasses in the case. As a result of this, it is useful where an eyeglass strap is adjustable to permit ease of removal and to allow the wearer to hang the eyeglasses from his or her neck when not in use.

The value of eyeglass retaining straps and adjustable retaining straps has been recognized in the past. One such example is found in U.S. Pat. No. 3,397,026 issued 13 Aug. 1968 to Spina. Here, a solid but flexible, resilient cord is knotted at each end and is folded to form end loops which are passed through a funnel-like sleeve. Each sleeve has a large mouth through which the loop is inserted and a narrow mouth from which the loop then protrudes to form a bight portion. Because of the increased size of the knot, the knotted end of the loop cannot pass through the narrow mouth so that each of the looped portions may encircle a respective temple piece and be tightened thereon. A central sleeve receives a central portion of the cord to take up slack, and a central marker in the form of a immovable split-shot is affixed to divide the eyeglass strap into two equal sections.

Other examples of protractive straps are shown, for example, in U.S. Pat. No. 2,704,961 issued 29 Mar. 1955 to Weil and U.S. Pat. No. 3,874,776 issued 1 Apr. 1975 to Seron. In the Weil patent, the ends of the temple pieces are received by sleeves into which the temple piece ends are telescopically inserted. In the Seron patent, a protective retaining strap is attached by means of a tubular rubber grommet and an adjustable tightening ring.

U.S. Pat. No. 2,819,650 issued 14 Jan. 1958 to Seron shows a strap which may be adjusted to accommodate different sized heads, but is not adjustable to allow the hanging of the eyeglasses from the neck of the wearer. U.S. Pat. No. 2,660,092 issued 24 November 1953 to Bloom shows and adjustable strap used to replace the temple pieces of the eyeglasses and U.S. Pat. No. 1,819,738 issued 18 Aug. 1931 to Daniels teaches a modification of the eyeglass temple pieces and a flexible strap that extends over the top of the wearer's head.

Despite the development of these prior art straps, there remains a need for an improved adjustable retaining strap. The present invention has thus been developed to meet this need.

SUMMARY OF THE INVENTION

It is an object of the present invention to provide a new and useful adjustable retaining strap for eyeglasses which is inexpensive in construction yet universal in application.

It is another object of the present invention to provide a retaining strap for eyeglasses which may be adjusted to accommodate different eyeglass styles and shapes and which may be selectively adjusted to the size of the wearer's head.

Another object of the present invention is to provide an adjustable retaining strap for eyeglasses which has an adjustable effective length to snugly retain the eyeglasses on the head of the wearer in one position yet which may be loosened whereby the eyeglasses may be hung from the neck of the wearer by the retaining strap.

A still further object of the present invention is to provide an adjustable retaining strap for eyeglasses wherein the temple pieces are positively engaged by the ends of the eyeglass strap in a manner which reduces the possibility of inadvertent loosening and slippage.

The present invention, then, is directed to an adjustable retaining strap used in conjunction with a pair of eyeglasses having a frame and a pair of temple pieces which extend from the frame rearwardly to temple ends. The retaining strap includes an elongated tubular member that is constructed of a flexible resilient material. A plug member is inserted into each of the free ends of the tubular member. Each plug member has an enlarged head at a leading end and a base at a trailing end; the head and base are interconnected by a shaft portion extending longitudinally therebetween. The head has a transverse diameter which is larger than the inner diameter of the tubular member and is larger than the transverse dimension of the shaft so that the resilient member of the tube stretches over the enlarged head to resiliently grip the head member to retain it in the mated position. End portions of the tubular member are then folded over to define end loops having bight portions. Each end loop is inserted through a retaining sleeve with each retaining sleeve having a body portion formed with a longitudinal first passageway. The size of these first passageways is dimensioned to prevent the head of the respective plug member from passing through the retaining sleeve so that each loop may be placed around a respective temple end and a central portion of the tubular member between the loops pulled to constrict the loop until the plug member engages the passageway of its respective retaining sleeve.

In the preferred embodiment, additional features are provided to further enhance this basic structure. For example, a central sleeve may be provided with the central sleeve having a second passage extending therethrough with the second passageway operative to receive and frictionally retain a central bight of the central portion in order to adjust the effective length of the retaining strap. A free sliding bead or clasp may be positioned on the central bight to prevent inadvertent removal of the central sleeve. In order to increase the positive engagement of each end plug member with its respective end sleeve, the head of the plug member may be conically shaped, and the first passageway may be flared to provide a seat so that, when the plug member is advanced into the first passageway, the head thereof engages the seat so as to clamp the tube member therebetween. Thus, increased force on the central portion of the tubular member increases the clamping action and the tightening of each end loop about the temple piece. To assist in retaining each plug member in its respective tube end, the shaft of each plug member may be provided with a waisted portion having a reduced diameter adjacent its head. Each retaining sleeve may be formed with a lateral disc-shaped element adapted to be gripped by the fingers when the end loops are removed from the temple piece ends.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 is a perspective view of the adjustable retaining strap according to the present invention used in conjunction with a pair of eyeglasses mounted on the head of a wearer;

FIG. 2 is a perspective view of the adjustable retaining strap shown in FIG. 1;

FIG. 3 is a perspective view of a central bead used in constructing the retaining strap of FIG. 2;

FIG. 4 is a perspective view of a central sleeve element used in constructing the retaining strap shown in FIG. 2;

FIG. 5 is a cross-sectional view taken about lines 5—5 of FIG. 4;

FIG. 6 is a side view in elevation of a plug member used in constructing the retaining strap of FIG. 2;

DETAILED DESCRIPTION OF THE PREFERRED EMBODIMENT

Figure 7:
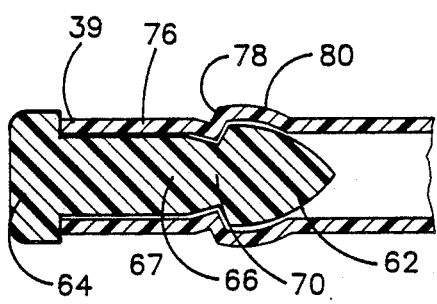
FIG. 7 is a cross-sectional view of a plug element received in the resilient tube according to the present invention.

The present invention is directed to an adjustable retaining strap used in conjunction with a pair of eyeglasses in order to adjustably retain the eyeglasses on the head of the wearer. Thus, the present invention is specifically directed to a retaining strap that is adjustable for differently styled eyeglasses and for different sizes of the human head. In use, then, the preferred embodiment of the present invention is shown in FIG. 1 as a retaining strap 10 which helps mount a pair of eyeglasses 12 to head 14 of the wearer. To this end, eyeglasses 12 includes lens-holding front frame 16 and a pair of temples, such as temple 18, which extends rearwardly from the corners of frame 16 alongside head 14 to terminate in a free temple end 20 that extends over the ear 22 of the wearer. Retaining strap 10 receives each temple end 20 and extends therebetween.

Adjustable strap 10 is best shown in FIG. 2 and is formed of an elongated tubular member 30. Tubular member 30 is constructed of a resilient flexible material, such as surgical tubing, having an inner diameter and an outer diameter in a relaxed state. Tubular member 30 is provided with a pair of end loops 32 each having a bight portion 34 as more thoroughly described below. Furthermore, in the preferred embodiment, tubular member 30 includes a central loop 36 having a bight portion 38, also as described below. Tubular member 30 receives a central bead 40, a central sleeve 50, a pair of end plugs 60 and a pair of end sleeves 90 each of which is constructed as a single molded piece of plastic material configured as more thoroughly described below.

More specifically, adjustable retaining strap 10 is constructed by mounting a free sliding central bead 40 on a central portion thereof. To this end, the construction of central bead 40 is shown in FIG. 3 where it should be appreciated that bead 40 may be formed as a spherical plastic element having a diametric bore 42 formed therethrough. Bore 42 is sized so as to have a larger diameter than the outer diameter of tubular member 30 so that it may freely slide on tubular member 30. After mounting, bead 40 is placed at a desired location along tubular member 30 and tubular member 30 is folded on itself about bead 40 to form central loop 36 which is held in position by central sleeve 50.

The construction of central sleeve 50 is shown in FIGS. 4 and 5 where it should be appreciated that central sleeve 50 is a plastic, disc-shaped element which is also provided with a passageway 52 extending therethrough. Passageway 52 is oval in cross-section and is sized so that its smaller dimension is slightly less than the outer diameter of tubular member 30. In its greater dimension, passageway 52 is dimensioned approximately twice the diameter of tubular member 30. Thus, passageway 52 receives the doubled portions 54 and 56 of tubular member 30, shown in FIG. 5, and is both frictionally and resiliently retained in a selected position which may be adjusted to change the size of central loop 36.

Free ends 39 of tubular member 30 each receive a plug member 60, as is best shown in FIGS. 6 and 7. As is shown in FIG. 6, each plug member 60 includes an enlarged head 62 formed at a leading end thereof, a base 64 formed at a trailing end thereof, and a shaft 66 extending longitudinally between head 62 and base 64. Enlarged head 62 is formed in a conical shape having an outer surface 63 which is forwardly convergent to a forward tip 68. Enlarged head 62 has a maximum dimension or diameter "a" which is larger than the inner diameter of tubular member 30. Shaft 66 is cylindrical in shape and has a diameter approximately the same as inner diameter of tubular member 30. However, shaft 66 includes a waisted portion 70 adjacent enlarged head 62 with waisted portion 70 formed as a first frustoconical section 72 and a second frustoconical section 74. Frustoconical section 72 is forwardly convergent while frustoconical section 74 is forwardly divergent with the rate of divergence of section 74 being greater than the rate of convergence of section 72. Base 64 is formed as a transverse disc having a diameter approximately the same as the outer diameter of tubular member 30.

Each plug 60 is matably received in a respective end portion 39 of tubular member 30, as is best shown in FIG. 7. As is shown in that figure, plug 60 is advanced into tubular member 30 so that end portion 39 abuts base 64. Accordingly, tubular portion 76 engages the cylindrical sidewall 67 of shaft 66 and a convoluted portion 78 engages waisted portion 70. Due to the size of enlarged head 62, tubular member is expanded, at expanded portion 80, to extend around enlarged head 62 after which tubular member 30 relaxes to its relaxed position having an inner diameter "b" and an outer diameter "c", shown in FIG. 7. It should be appreciated in reviewing FIG. 7 that the construction of plug 60 helps firmly retain plug 60 in end 39 of tubular member 30 since withdrawal of plug 60 requires rapid expansion of tubular member 30 from narrow waisted portion 70 along rapidly divergent frustoconical section 74 so that tubular member 30 may pass over enlarged head 62. Furthermore, due to its stretching, expanded portion 80 conforms to the shape of enlarged head 62 at its region of maximum dimension and resiliently grips head 62.

Figure 8:
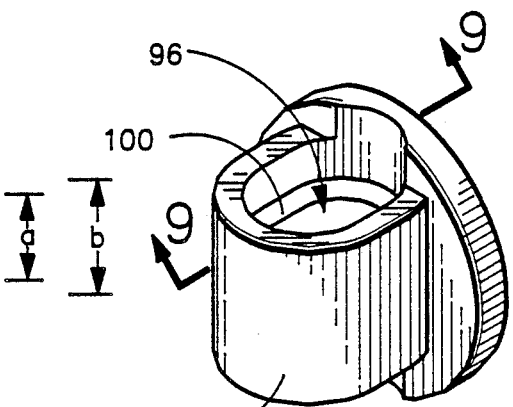
FIG. 8 is a perspective view of an end sleeve used in constructing the retaining strap of FIG. 2.
Figure 9:
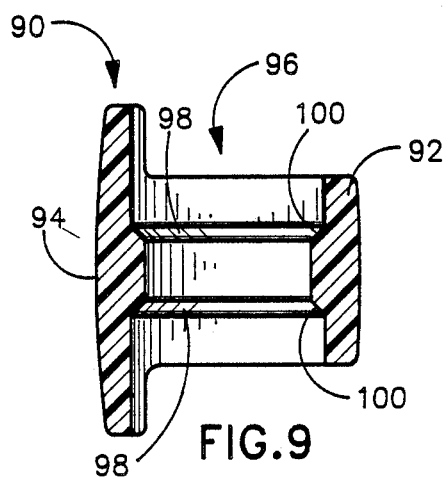
FIG. 9 is a cross-section view taken about lines 9—9 of FIG. 8.
Figure 10:
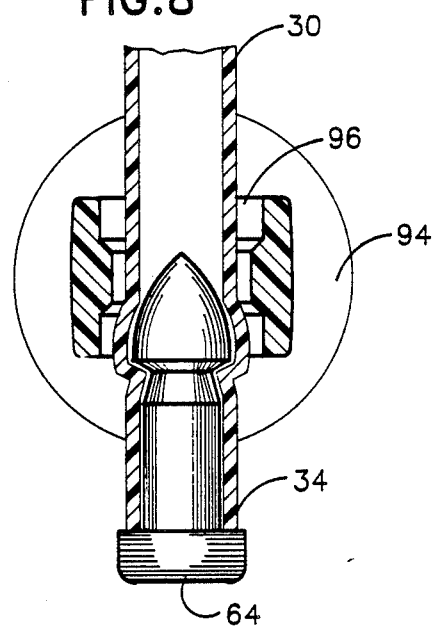
FIG. 10 is a cross-sectional view showing the end sleeve of FIGS. 8 and 9 engaging a tube end portion and a plug member inserted therein according to the present invention.

After each plug member 60 is mounted in its respective end 39 of tubular member 30, the free end portions of tubular member 30 are each folded upon itself to form end loops 32. As noted above, end loops 32 are mounted and retained by end sleeves 90 so that end loops 32 form respective bight portions 34. The construction of each end sleeve 90 is best shown in FIGS. 8-10 where it should be appreciated that each end sleeve 90 includes a body portion 92 and a lateral discular element 94 attached thereto. Body portion 92 includes a longitudinal passageway 96 formed therethrough with passageway 96 being countersunk to provide seats 98 having angled sidewalls 100. Discular element 94 is laterally offset from the axis of longitudinal passageway 96 and is formed in a plane parallel thereto, as is shown in FIG. 9.

It should be appreciated that longitudinal passageway 96 is oval in cross-section, similar to passageway 52 of central sleeve 50 to accommodate the double passage of tubular member 30 therethrough. At its smaller dimension, passageway 96 is slightly smaller than the diameter of tubular member 30 and, at its large dimension is slightly smaller than twice the diameter of tubular member 30. Thus, at its smaller dimension, passageway 96 is less than diameter a of enlarged head 62 of plug member 60. Accordingly, as is shown in FIG. 10, a respective end 39 of tubular member 30 is prevented from being pulled through passageway 96. Hence, as is shown in FIG. 10, as leading tip 68 of plug member 60 along with tubular member 30 advances to passageway 96, enlarged head 62 engages seats 98. When this happens, expanded portion 80 of tube 30 around enlarged head 62 becomes pinched or clamped between outer surface 63 and angled sidewalls 100. Furthermore, head 62 collapses the other portion of tubular member 30, that also passes through passageway 96 adjacent head 62 thereby further locking the loop. Any force in the direction of arrow F in FIG. 10 increases this clamping force so as to increasingly engage plug 60 with passageway 96 and to increasingly clamp tubular member 30.

The ease of constructing retaining strap 10 may now be more fully appreciated. First, central bead 40 is slid onto tubular member 30 and is positioned at a desired location. Central loop 36 is then formed about bead 40, and the ends of tubular member 30 are both passed through passageway 52 of central sleeve 50. End plug members 60 are now inserted into end portions 39, and end portions 39 are each folded into an end loop 32. Each end loop 32 is pulled through passageway 96 of a respective end sleeve 90.

The operation of adjustable strap 10 can now also be more fully appreciated with reference to FIG. 2. In use, each end loop 32 is placed over a respective temple piece and a central portion of tubular member 30 between end loops 32 is pulled so that loops 32 tighten about each temple piece. As this occurs, ends 39 are drawn towards end sleeves 90 until plugs 60 engage each sleeve 90 with loop 32 in the tightened position. Central sleeve 50 may then be moved toward bead 40 to reduce the size of loop 36 and the eyeglasses may be easily placed over the head of the wearer with adjustable strap 10 attached. The wearer then moves sleeve 50 to increase the size of loop 36 thus shortening the effective length of strap 10 until strap 10 snugly secures the eyeglasses to his/her head. The eyeglasses can be used in this position but may be removed either by adjusting sleeve 50 or simply by resiliently stretching tubular member 30. Should the wearer desire to hang the eyeglasses from his or her neck, the wearer simply moves sleeve 50 until it abuts bead 40 to place strap 10 in its maximum extended position. As noted above, bead 40 is freely slidable on tubular member 30 so that the wearer, if desired, can configure loop 36 at any position between sleeves 90. Thus, loop 36 may be placed adjacent an ear or immediate in back of the wearer's head, as desired. To release each loop 36, the wearer simply pulls on a respective end 39 and its plug member 60. This operates to stretch the portion of tubular member 30 in the passageway 96 which, due to the resiliency of tubular member 30, reduces its transverse dimension thereby releasing the locking engagement.

Figure 11:
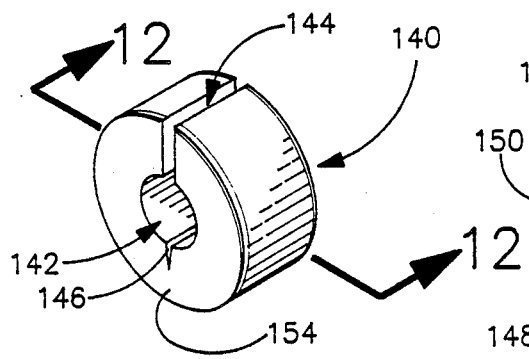
FIG. 11 is a perspective view of a clasp element alternately used in place of the central bead of FIG. 3 in an alternate construction of the present invention.
Figure 12:
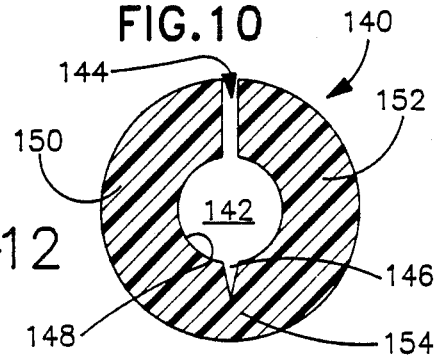
FIG. 12 is a cross-sectional view taken about lines 12—12 of FIG. 11.

Tubular bead 40, if desired, may be replaced by a resilient clasp 140, shown in the alternate embodiment of FIGS. 11 and 12. Here, clasp 140 is formed as a cylindrical sleeve having a passageway 142 therethrough with passageway 142 being slightly smaller in diameter than the outer diameter of tubular member 30. Sleeve 140 is split at 144, and a channel 146 is cut in the inner sidewall 148 of passageway 142 at a diametrically opposite location from split 144. This configures sleeve 140 into sections 150 and 152 which may be moved apart and pivoted about region 154 adjacent channel 148 so that it may be clamped around tubular member 30 in place of bead 40, described above. Clasp 140 does not readily slide along tubular member 30, however.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. An adjustable retaining strap for eyeglasses having a frame including lens-holding frames and a pair of temple pieces extending from corners of the frame rearwardly to temple ends, comprising:
    an elongated tubular member having opposite tube end portions and constructed of a flexible resilient material, said tubular member having an inner tube diameter and an outer tube diameter when the tubular member is in a relaxed state;
    a pair of plug members, each plug member matably received in a respective tube end portion and having an enlarged head at a leading end, a base at a trailing end and a shaft portion extending longitudinally between said head and said base, said head having a transverse dimension larger than the inner diameter of said tube and larger than the transverse dimension of said shaft portion such that each plug member may be inserted into a respective tube end portion with resilient material stretched over the enlarged head so that said enlarged head is resiliently gripped in the tube end; and
    a pair of retaining sleeves, each said sleeve having a body portion having a longitudinal first passageway formed therethrough, said tubular member having opposite end portions folded into end loops each having a bight portion that is received through a respective passageway such that the tubular member passes twice through each passageway, each said passageway dimensioned to prevent the head of its respective plug member from passing therethrough whereby each end loop may be placed around a respective said temple end and constricted around the respective said temple end with each plug member engaging the passageway of its respective retaining sleeve with a central portion of the tubular member extending between said end loops.

2. An adjustable retaining strap according to claim 1 including a central sleeve having a second passageway extending therethrough and operative to receive and frictionally retain a central bight portion of a central loop of said central portion for adjusting the effective length of said retaining strap.

3. An adjustable retaining strap according to claim 2 including a bead on said central bight portion operative to prevent withdrawal of said central loop from said second passageway.

4. An adjustable retaining strap according to claim 3 wherein said bead has a bore larger in dimension than the outer tube diameter whereby said bead freely slides on the central bight portion.

5. An adjustable retaining strap according to claim 3 wherein said bead is a clasp element which engages said central bight portion.

6. An adjustable retaining strap according to claim 1 wherein the shaft of each said plug member has a waisted portion of reduced dimension adjacent said enlarged head.

7. An adjustable retaining strap according to claim 6 wherein said waisted portion is formed by a first frustoconical section adjacent said shaft and convergent in a forward direction and a second frustoconical section adjacent said enlarged head and divergent in a forward direction.

8. An adjustable retaining strap according to claim 7 wherein the rate of convergence of the first frustoconical section is less than the rate of divergence of the second frustoconical section.

9. An adjustable retaining strap according to claim 1 wherein the base of each said plug member is formed as a flat, transverse disc having a diameter substantially the same as the outer tube diameter.

10. An adjustable retaining strap according to claim 1 wherein each said enlarged head is conical in shape and forwardly convergent to a forward tip.

11. An adjustable retaining strap according to claim 10 wherein the transverse dimension of said head is less than the outer tube diameter.

12. An adjustable retaining strap according to claim 1 wherein the first passageway of each retaining sleeve is provided with a flared seat operative to engage said head.

13. An adjustable retaining strap according to claim 1 wherein each said retaining sleeve has a disc element on a lateral side of said body portion and oriented in a plane parallel to the longitudinal axis of its respective said first passageway.

14. An adjustable retaining strap for eyeglasses having a frame including a pair of temple pieces extending from the frame rearwardly to temple ends, comprising:
    an elongated tubular member having opposite tube end portions and constructed of a flexible resilient material, said tubular member having an inner tube diameter and an outer tube diameter when the tubular member is in a relaxed state;
    a pair of plug members, each said plug member including an elongated cylindrical shaft, an enlarged head at a leading end of the plug member and a disc-shaped base at a trailing end of the plug member, said shaft having a waisted portion of reduced diameter adjacent said head, each said plug member matably received in a respective tube end portion such that said base abuts the tubular member with said tube end portion expanded around said head whereby each said plug member is resiliently and frictionally retained in a respective said tube end portion;
    a pair of retaining sleeves, each said sleeve having a body portion having a longitudinal first passageway formed therethrough, said tube end portions folded into end loops each having a bight portion that is received through a respective first passageway such that the tubular member passes twice through each passageway, each said first passageway dimensioned to prevent the head of its respective plug member from passing therethrough whereby each end loop may be placed around a respective said temple end and constricted around the respective said temple end with each plug member engaging the passageway of its respective retaining sleeve with a central portion of the tubular member extending between said end loops to define the effective length of said retaining strap.

15. An adjustable retaining strap according to claim 14 including bead means on said central bight portion for preventing withdrawal of said central loop from said second passageway.

16. An adjustable retaining strap according to claim 15 wherein said bead means is a bead element freely slidable on said tubular member.

17. An adjustable retaining strap according to claim 15 wherein said bead means is a clasp element which engages said central bight portion.

18. An adjustable retaining strap according to claim 14 wherein each said enlarged head is conical in shape and forwardly convergent to a forward tip.

19. An adjustable retaining strap according to claim 18 wherein the transverse dimension of said head is less than the outer tube diameter.

20. An adjustable retaining strap according to claim 14 wherein the first passageway of each retaining sleeve is provided with a flared seat operative to engage said head, said tubular member being clamped between each said head and its respective seat when said plug member engages its respective first passageway.

* * * * *

UNITED STATES PATENT AND TRADEMARK OFFICE
CERTIFICATE OF CORRECTION

PATENT NO.   :   4,783,164
DATED        :   NOVEMBER 8, 1988
INVENTOR(S)  :   ROBERT A. HEIBERGER

It is certified that error appears in the above-identified patent and that said Letters Patent is hereby corrected as shown below:

```
    Column 2, line 23, delete "and", substitute --an--.

Column 5, line 13, delete " "a" ", substitute --"d"--.
             line 36, delete " "b" ", substitute --"a"--.
             line 37, delete " "c" ", substitute --"b"--.

Column 6, line  3, delete "a of", substitute --of an--.

line 53, delete "immediate", substitute
    --immediately--.
             line 54, delete "36", substitute --32--.
```

In the Drawings:

Please delete Figures 2 and 10, substitute Figures 2 and 10 on the enclosed sheets.

Signed and Sealed this

Eighteenth Day of June, 1991

Attest:

HARRY F. MANBECK, JR.

Attesting Officer

Commissioner of Patents and Trademarks